United States Patent [19]

Harrison

[11] 4,011,736
[45] Mar. 15, 1977

[54] COLD STORAGE TANK

[75] Inventor: Henry Harrison, Locust Valley, N.Y.

[73] Assignee: Halm Instrument Co., Inc., Glen Head, N.Y.

[22] Filed: Nov. 12, 1975

[21] Appl. No.: 631,057

[52] U.S. Cl. .................... 62/260; 61/.5; 62/435; 62/438; 165/45

[51] Int. Cl.² ............. F25D 23/12; F25D 17/02; F25D 11/04; B65G 5/00

[58] Field of Search .......... 62/435, 438, 260, 59, 62/356; 61/.5; 165/45

[56] References Cited

UNITED STATES PATENTS

| | | | |
|---|---|---|---|
| 1,576,867 | 3/1926 | Swan | 62/435 |
| 2,342,211 | 2/1944 | Newton | 62/435 |
| 3,111,371 | 11/1963 | Bull | 61/.5 |
| 3,191,386 | 6/1965 | Wiegel et al. | 61/.5 |
| 3,456,452 | 7/1969 | Hilbert | 62/435 |
| 3,516,568 | 6/1970 | Fish | 61/.5 |
| 3,931,851 | 1/1976 | Harris et al. | 62/260 |

FOREIGN PATENTS OR APPLICATIONS 643,878  5/1928  France .................... 62/438

Primary Examiner—Lloyd L. King
Attorney, Agent, or Firm—James P. Malone

[57] ABSTRACT

A cold storage tank is mounted in a pit in the ground. An outer plastic sheet barrier lines the pit. A lining of incompressible insulating material lines the interior surface of the outer barrier. An inner plastic sheet barrier lines the interior surfaces of the insulation. A plurality of bags of fresh water are mounted inside of the inner barrier. Brine and gravel fills the inner barrier and the voids between said fresh water bags and covers the fresh water bags. An out-take pipe extends into the brine and is connected to a pump. A shallow tray is mounted above ground and the out-take pipe is connected to spray the brine onto the tray during freezing weather. An intake pipe is connected to drain the tray and return the cooled brine to the interior of the inner barrier. The brine surrounding the water bags is circulated through a heat exchanger for cooling air when required. Therefore the water in the bags will be frozen during freezing weather and cool air may be drawn out during warm weather for house or other cooling purposes.

9 Claims, 1 Drawing Figure

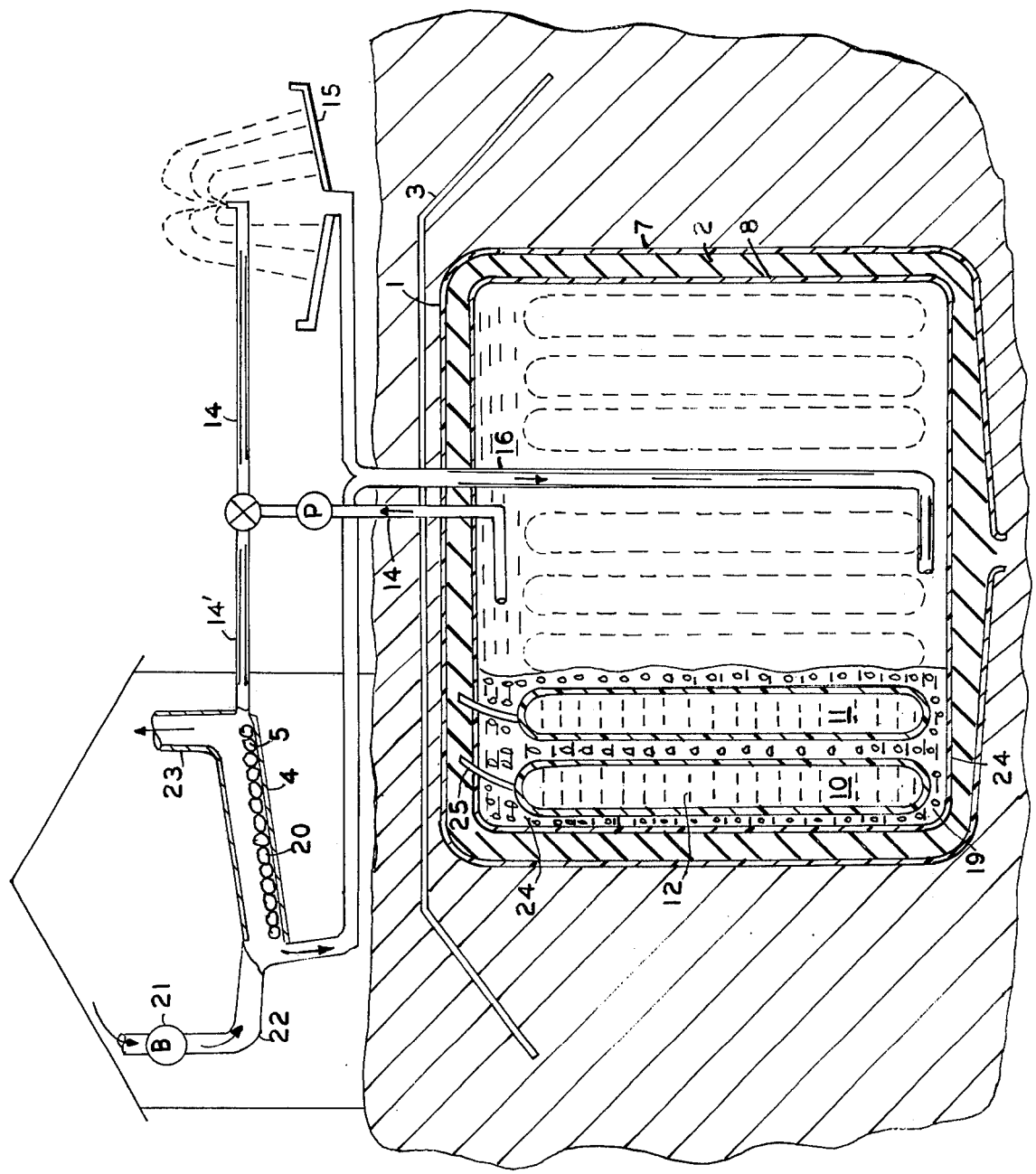

COLD STORAGE TANK

This invention relates to cold storage tanks and more particularly to such means for providing cooling for a typical house.

Due to the energy crisis, there is a need for cooling and air conditioning means which uses a minimum amount of energy. The present air conditioning load on the utility power systems reaches its greatest peak on hot summer days and requires large amounts of electrical power to meet these peak demands.

The present invention provides means and methods for providing air conditioning for a typical house with a negligible energy expenditure. The only power consuming devices required are a relatively small fluid pump, and a blower.

The present invention provides a cold storage tank which is adapted to be mounted in a pit in the ground. The pit is suitably insulated with plastic foam and plastic barriers and the insulated portion of the pit or tank contains a plurality of bags of fresh water which are immersed in a brine solution. During the freezing weather, the brine is sprayed onto a tray above ground and returns to the tank in order to freeze the water in the insulated bags. Heat exchange means are provided in heat exchange relation with the water bags so that during the warm weather, air may be cooled for air conditioning purposes.

A tank containing about 700 cubic feet of ice, would be sufficient to air condition a well insulated small house in the summer in the area of the Northeastern United States. There is more than sufficient freezing weather to freeze this amount of ice during the winter. For instance, it is estimated that in New York there are 1,000 degree days of cooling per summer which would require about 5 million BTUs in storage which can be accomplished with 700 cubic feet of ice. The New York winter time has approximately 40 below freezing days so that there is sufficient cold weather to freeze the required amount of ice. A degree day is a one degree difference, plus or minus, from the desired temperature for one day.

Accordingly, a principal object of the invention is to provide new and improved cold storage means for air conditioning and cooling purposes.

Another object of the invention is to provide new and improved cold storage means for air conditioning purposes without requiring any mechanical equipment except a small liquid pump and blower.

Another object of the invention is to provide new and improved cold storage tank means for providing house air conditioning with a negligible expenditure of energy.

Another object of the invention is to provide new and improved cold storage tank means mounted in a pit in the ground, said pit having continuous sides and a bottom, an outer barrier having continuous sides and a bottom lining in said pit, a lining of insulation on the interior surface of said outer barrier, an inner barrier lining the interior surface of said insulation, a plurality of bags of freezable fluid mounted inside of said inner barrier, low freezing point fluid substantially filling said inner barrier and the voids between said fluid bags, an out-take pipe extending into said low freezing point fluid, a pump connected to said out-take pipe, a shallow tray mounted above ground, said outtake pipe being connected to spray said low freezing point fluid onto said tray during freezing weather, an intake pipe connected to drain said tray and return the low freezing point fluid to said interior of the inner barrier, whereby the fluid in said bags will be frozen in freezing weather, and heat exchange means connected in heat exchange relation to said fluid bags, whereby air may be cooled during warm weather for cooling purposes.

These and other objects of the invention will be apparent from the following specification and drawing.

Referring to the drawing, the invention comprises a cold storage tank which is mounted in a pit 1 in the ground, which may be of any convenient shape, but preferably a shape having small surface area in relation to the volume of the tank. The pit may be lined with an outer barrier 7, which may be a plastic sheet, for instance, vinyl or polyethylene.

The pit 1 or the outer barrier 7, is lined with incompressible insulation 2 such as closed cell plastic foams and is preferably provided with a drain at the bottom to dispose of water from the soil which may condense on the outside of the tank. In areas where the soil is dry, insulation on the bottom of the tank may be omitted.

An inner plastic sheet barrier 8, lines the interior surface of the incompressible insulation. The inner barrier tank is substantially filled by a large scale cellular structure 19, plastic bags 10, 11, etc., containing fresh water 12 within the cell compartments, and a lower freezing point liquid such as brine 24, which can circulate through the cell structure and around the outside of the fresh water bags. The bags are sized for adequate heat transfer rate from the brine to the freezing fresh water within, and may be cylinders about 1 foot in diameter. The plastic fresh water bags do not completely fill the cell cavities, so that there is room for expansion of the bags when the fresh water freezes.

The cellular matrix around the bags supports, localizes and protects them, and withstands the pressures of the surrounding earth. An economical way to fabricate the cell structure 19 is to cast it in place from sized grouted gravel around inflated bags. The inflated bags may be the fresh water bags, temporarily inflated with air or water to form the cell cavities. The bags may be elastically distended to provide extra space for freezing of the fresh water. Each bag may be fabricated with one or two filling tubes 25 so that fresh water can be substituted for the inflating air after the grouted gravel has hardened into a rigid cellular structure.

Alternatively, the cellular structure may be an assemblage of rigid prefabricated pipes, arches or plates which contains voids housing the plastic bags of fresh water.

The out-take pipe 14, extends into the brine. A pump P is connected to the out-take pipe to pump the brine onto a tray 15, which is exposed to outdoor air. The tray 15, is drained by an intake pipe 16, which returns the cold brine to the tank. This cooling operation only takes place during freezing weather. When the brine is not being circulated, it provides substantial added insulation for fresh water bags near the center of the tank. In the course of a typical winter in the northern portion of the United States, there will be more than sufficient freezing weather to freeze all of the water bags. At New York City, for example, there are about 1,000 hours of freezing weather per year.

The whole assembly may be buried several feet in the ground for better insulation. A plastic barrier 3 above the tank may be used to shield the surrounding earth from warm rain water.

In order to extract the cooling from the frozen ice a heat exchanger 20 is provided. This may comprise a covered cement tray 4 having a layer of stones 5 providing an extended surface. Cold brine is circulated in the tray, through pipe 14", and valve V which connects the winter and summer circuts. Warm air is blown into the heat exchanger by the blower 21, which is connected in the pipe 22. The air passes in heat exchanging relationship with the stones 5, on tray 4, and cool air passes out through the pipe 23. This pipe may be connected to air conditioning ducts in the house. Therefore, during the winter time, sufficient ice can be frozen with the expenditure of negligible energy and in the summer time, sufficient air can be cooled to air condition a house. The volume of ice required depends upon the size of the house and its geographical location. It is estimated that an ice volume of 700 cubic feet is sufficient to air condition a small well insulated single family house in the New York area during the summer with a negligible expenditure of energy.

Since the structure is entirely supported by the ground and the insulating lining, no additional structural members are required. The inner and outer barriers may be of plastic sheets since there is no strain on them. It may be desirable to filter the circulating brine in order to remove any bacteria.

Although other equivalent liquids may be used for the fresh water and brine, cost will be important for the large quantities required. For water, one needs a liquid of high latent heat which freezes below comfort temperatures. For brine, one can use any liquid having a freezing point sufficiently below the liquid in the bag and that can be prevented from freezing at winter temperatures. For example, ethylene glycol and water or glycerine and water might be used instead of brine to freeze fresh water.

The cold storage tank of the present invention may be used in cooperation with the Heat Storage Tank of my co-pending application, entitled "HEAT STORAGE TANK," Ser. No. 625,061 filed on Oct. 23, 1976, in order to provide a complete heating and cooling system for a house with a negligible expenditure of energy.

I claim:

1. Cold storage tank means mounted in a pit in the ground, said pit having continuous sides and a bottom,
   a lining of incompressible insulation on the interior surface of said pit,
   an inner tank lining the interior surface of said insulation,
   a rigid cellular structure substantially filling said inner tank,
   a plurality of bags of freezable liquid mounted inside the cells of said rigid cellular structure,
   low freezing point liquid substantially filling said inner tank and the voids surrounding said liquid bags,
   first heat exchange means for removing heat from said low freezing point liquid to freeze said freezable liquid,
   and second heat exchange means for adding heat to said low freezing point liquid to melt said freezable liquid, thereby producing a useful cooling effect.

2. Apparatus as in claim 1, including an outer barrier between said insulation and the wall of said pit.

3. Apparatus as in claim 2, wherein said barrier is of plastic sheet.

4. Apparatus as in claim 1, including a rain barrier above and extending beyond the sides of said tank so as to prevent rain water from bringing heat to the sides of said tank.

5. Apparatus as in claim 1, wherein said freezable fluid in said bags is fresh water, and said low freezing point fluid is brine.

6. Apparatus as in claim 1, in which said rigid cellular structure is cast of sized gravel bonded by cement grout.

7. Apparatus as in claim 1, in which said first heat exchange means comprises an out-take pipe extending into said low freezing point liquid,
   a pump connected to said out-take pipe,
   a shallow tray in heat exchange relation with the outside air, said out-take pipe being connected to feed said low freezing point liquid onto said tray during freezing weather,
   and in intake pipe connected to drain said tray and return said low freezing point liquid to said interior of the inner tank, whereby the freezable liquid in said bags will be frozen in freezing weather.

8. Apparatus as in claim 1, in which said second heat exchange means comprises a chamber containing stones as an extended heat exchange surface, means for circulating said low freezing point fluid in heat exchange relation with said stones, and means for circulating warm air in contact with said stones, whereby said warm air may be cooled during warm weather.

9. Apparatus as in claim 1, in which each of said bags of freezable liquid is fabricated with at least one tube adapted for exchanging the fluid in said bag.

* * * * *